(12) United States Patent
Majumdar et al.

(10) Patent No.: US 7,467,230 B2
(45) Date of Patent: Dec. 16, 2008

(54) GLOBAL NAMES ZONE

(75) Inventors: Moon Majumdar, Seattle, WA (US);
Kamal Janardhan, Redmond, WA (US);
Jeffrey Westhead, Duvall, WA (US);
James M. Gilroy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 102 days.

(21) Appl. No.: 11/276,447

(22) Filed: Feb. 28, 2006

(65) Prior Publication Data

US 2007/0204038 A1 Aug. 30, 2007

(51) Int. Cl.
*G06F 15/16* (2006.01)
(52) U.S. Cl. ...................... 709/245; 709/225
(58) Field of Classification Search ............. 709/245, 709/223, 230, 250, 221, 222, 225; 707/3
See application file for complete search history.

(56) References Cited

U.S. PATENT DOCUMENTS

| | | | |
|---|---|---|---|
| 5,434,974 A | 7/1995 | Loucks et al. | |
| 6,167,446 A | 12/2000 | Lister et al. | |
| 6,249,813 B1 * | 6/2001 | Campion et al. | 709/222 |
| 6,324,577 B1 * | 11/2001 | Hirai | 709/223 |
| 6,493,765 B1 | 12/2002 | Cunningham et al. | |
| 6,976,090 B2 | 12/2005 | Ben-Shaul et al. | |
| 7,165,122 B1 * | 1/2007 | Sitaraman et al. | 709/250 |
| 2002/0046293 A1 * | 4/2002 | Kabata et al. | 709/245 |
| 2002/0188757 A1 * | 12/2002 | Yoon et al. | 709/245 |
| 2003/0074461 A1 * | 4/2003 | Kang et al. | 709/230 |
| 2003/0126241 A1 * | 7/2003 | Nagura et al. | 709/221 |
| 2003/0149690 A1 * | 8/2003 | Kudlacik et al. | 707/3 |
| 2004/0039798 A1 | 2/2004 | Hotz et al. | |
| 2004/0044791 A1 * | 3/2004 | Pouzzner | 709/245 |
| 2004/0078487 A1 * | 4/2004 | Cernohous et al. | 709/245 |
| 2004/0172463 A1 * | 9/2004 | King et al. | 709/223 |
| 2005/0066041 A1 | 3/2005 | Chin et al. | |
| 2005/0076139 A1 * | 4/2005 | Jinmei et al. | 709/245 |
| 2005/0076141 A1 | 4/2005 | Williams et al. | |

(Continued)

FOREIGN PATENT DOCUMENTS

KR 10-2001-0090090 A 10/2001

(Continued)

OTHER PUBLICATIONS

"Managing the domain table", UnixWare 7 release 7.1.4, Apr. 22, 2004.*

(Continued)

*Primary Examiner*—Jungwon Chang

(57) ABSTRACT

A DNS server includes one or more zones that store information, such as IP addresses, associated with domain names. These zones include a global names zone that stores data correlating host names to domain names. When a name query is received from a client device, the DNS server checks the global names zone for a record associated with the host name. If there is no record for the host name in the global names zone, then the query is answered using the DNS records found in a local copy of the authoritative zone. If there is a record for the host name in the global names zone, then the query is answered using the DNS records found in the global names zone. The IP address associated with the domain name is determined and returned to the client device.

22 Claims, 7 Drawing Sheets

U.S. PATENT DOCUMENTS

| | | | |
|---|---|---|---|
| 2005/0144323 A1* | 6/2005 | Gardos et al. | 709/245 |
| 2005/0198386 A1* | 9/2005 | Accapadi et al. | 709/245 |
| 2006/0112176 A1 | 5/2006 | Liu et al. | |
| 2006/0129697 A1* | 6/2006 | Vange et al. | 709/245 |
| 2006/0218303 A1* | 9/2006 | Adelman et al. | 709/245 |
| 2007/0204038 A1 | 8/2007 | Majumdar et al. | |
| 2007/0208877 A1 | 9/2007 | Kelley et al. | |

FOREIGN PATENT DOCUMENTS

| | | |
|---|---|---|
| KR | 10-2003-0015502 A | 2/2003 |

OTHER PUBLICATIONS

SBC, "Frequently Asked Questions", 2002.*

Microsoft Corp., "DNS Server Global Names Zone Deployment" pp. 1-21, Jun. 2007.

"How WINS Technology Works", http://technet2.microsoft.com/windowsserver/en/library/26ed4753-5f62-4a85-b683-75db0e5228ff1033.mspx?mfr=true, 2007.

Ladda Preechaveerakul., et al, "Intelligent DNS-based Naming System Mechanism" pp. 1-5, 2002.

International Search Report dated Aug. 6, 2007 for Application No. PCT/US2007/001981, 8 pages, 2007.

"Domain Name System", http://www.ietf.org/html.charters/OLD/dns-charter.html, 1994.

* cited by examiner

GLOBAL NAMES ZONE

BACKGROUND

The Domain Name System (DNS) is a system that stores information associated with domain names in a distributed database on one or more networks. The stored information includes the Internet Protocol (IP) address associated with a domain name. The domain name space may be thought of as a tree of domain names. Each node or leaf in the tree is associated with resource records, which hold information associated with the domain name. The tree is divided into zones. A zone is a collection of connected nodes that are authoritatively served by an authoritative DNS server. A DNS server may host one or more zones. Resolving a domain name may entail recursing through several DNS servers to find the needed information.

A domain name usually includes multiple parts separated by dots. For example, encarta.msn.com has three parts: encarta, msn, and com. The rightmost part is the top-level domain. In the example, the top-level domain is com. Each part to the left of the top-level domain is a sub-domain. In the example, msn is a second-level domain. The left-most part of the domain name is the host name. The host name specifies the name of a specific machine with a specific IP address in a domain. In the example, encarta is the host name.

In order for a host name to be resolved globally across multiple domain and zone boundaries, a machine has to register in all the domains, which greatly increases administration complexity. A host name that is needed globally cannot be added or managed easily or efficiently.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various technologies and techniques directed to methods and systems for a global names zone. In accordance with one implementation of the described technologies, a DNS server includes one or more lookup zones that store information, such as IP addresses, associated with domain names. These zones include a global names zone that stores data correlating host names to domain names. When the DNS server receives a registration for a domain name, the DNS server checks whether it hosts the authoritative zone for the domain name. If so, then the DNS server checks the global names zone to determine whether there is a record for the host name. If there is no record for the host name in the global names zone, the domain name is registered in the authoritative zone as requested. If there is already a record for the host name in the global names zone, then the registration of the domain name may be rejected.

When a name query is received from a client device, the DNS server determines whether it hosts the authoritative zone for the query. If not, then the name query may be forwarded to another DNS server that hosts the authoritative zone for the query. If the DNS does host an authoritative zone for the name query, then the DNS server checks the global names zone for a record associated with the host name. If there is no record for the host name in the global names zone, then the query is answered using the DNS records found in the local copy of the authoritative zone. If there is a record for the host name in the global names zone, then the query is answered using the DNS records found in the global names zone. In this case, any data in the authoritative copy of the zone is ignored.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
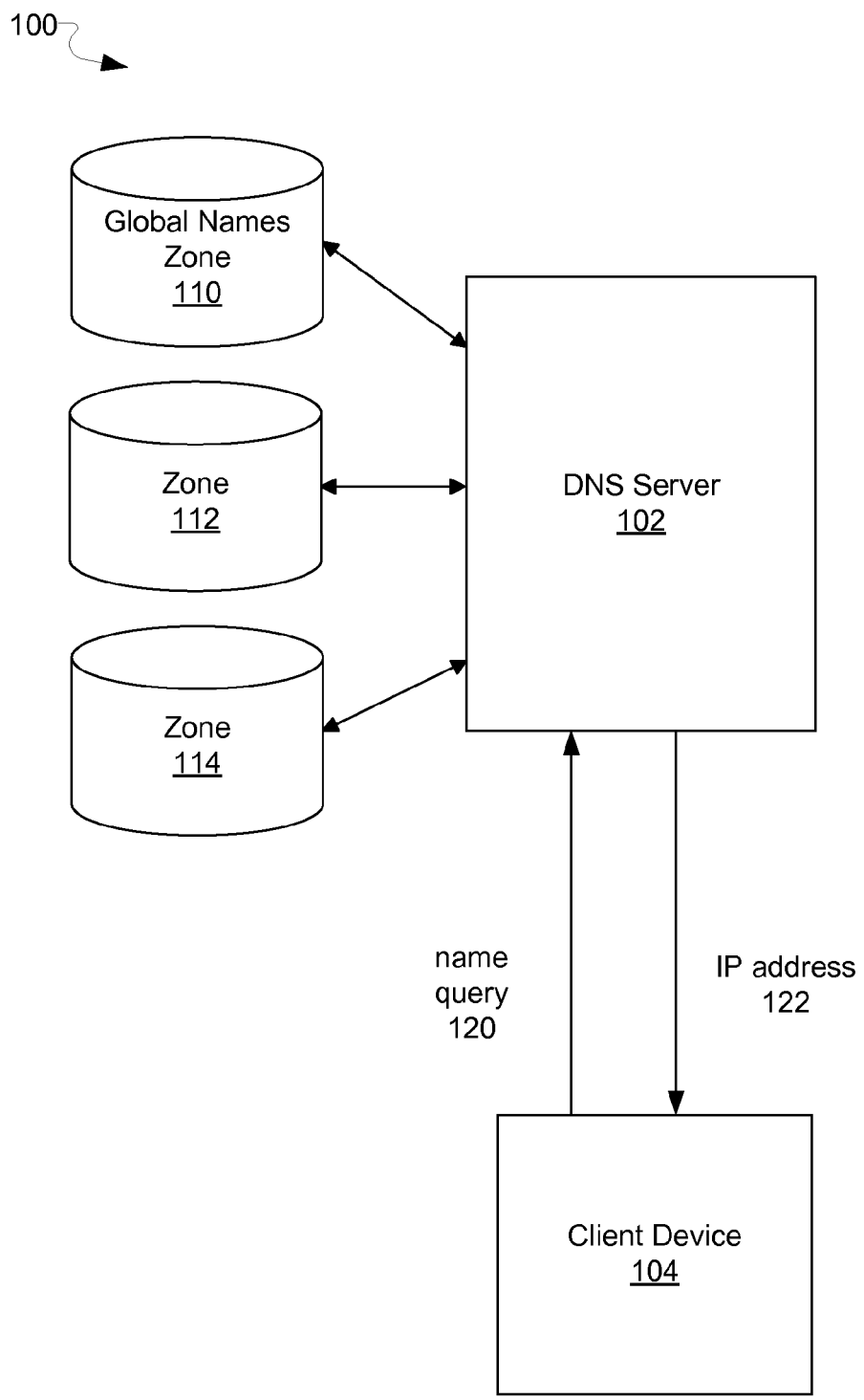
FIG. 1 is a block diagram illustrating an exemplary system for implementing a global names zone.

FIG. 1 is a block diagram illustrating an exemplary system 100 for implementing a global names zone. The system 100 includes a DNS server 102 and one or more zones, such as 110, 112, or 114. The zones store resource records that include information associated with domain names, such as an IP address associated with a domain name. One of the zones in system 100 is a global names zone 110. The global names zone 110 stores resource records correlating host names to domain names. For each record type, a host name stored in the global names zone 110 is uniquely correlated to one domain name.

When a client device, such as 104, wants to register a domain name, for example "encarta.msn.com", the DNS server 102 will first check the global names zone 110 to determine whether there is already a record for the host name. In the example, the host name is "encarta". If there is already a record for the host name, then the registration may be rejected. If there is no record for the host name, then the DNS server adds a record correlating the host name to the domain name. In the example, a record would be added that correlates "encarta" to "encarta.msn.com". The authoritative zone for the domain name, such as 112, stores a record associating the domain name to the IP address. In the example, the authoritative zone 112 may store a record associating the domain name "encarta.msn.com" to the IP address "207.142.131.200". After a record has been added for the host name "encarta" to the global names zone, other registrations for the same host name may be rejected. For example, if a client device wants to register a domain name "encarta.xyz.com", the registration may be rejected if an administrator has previously created an "encarta" record in the global names zone.

When a name query 120 is received at the DNS server 102 from a client device, such as 104, the DNS server 102 checks to see if it hosts the authoritative zone for the name query 120. If it does not, then the DNS server 102 may forward the name query 120 to another DNS server that hosts the authoritative zone for the name query 120.

If the DNS server 102 does host the authoritative zone for the name query 120, then the DNS server 102 will check the global names zone 110 to determine if there is a record for the host name. If so, the global names zone 110 will return the domain name associated with the host name. The DNS server 102 may then lookup a record for the domain name in the authoritative zone, such as 112, to determine the IP address associated with the domain name. The DNS server 102 may then return the IP address 122 to the client device 104.

Figure 2:
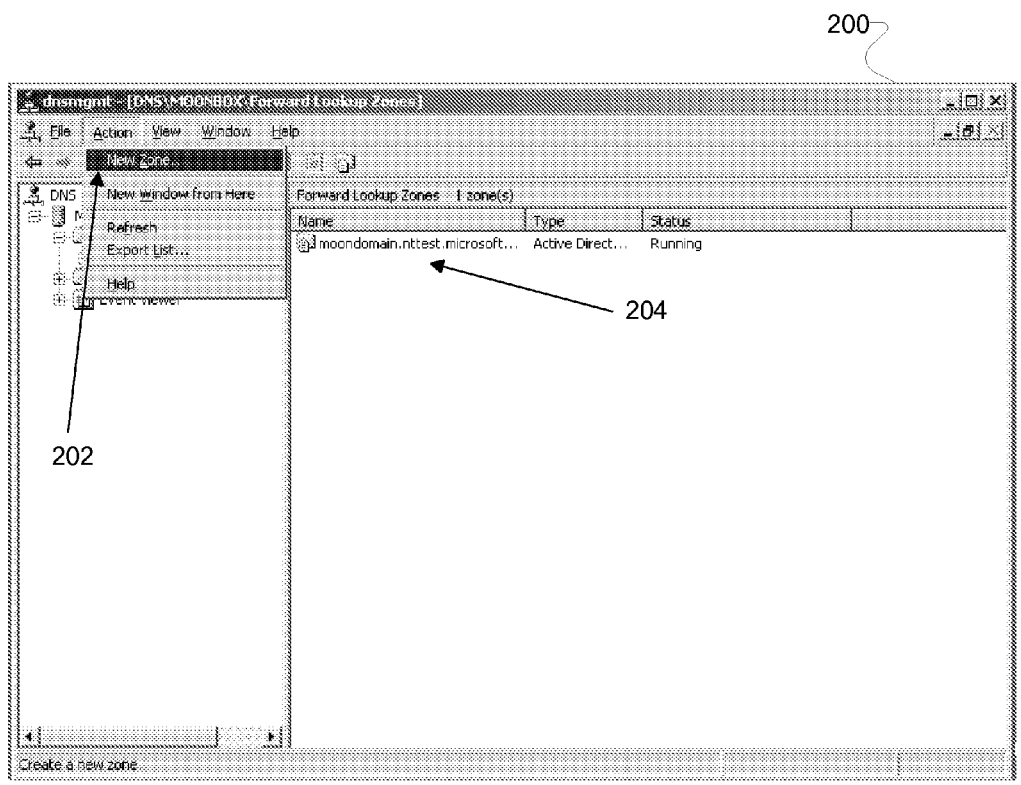
FIG. 2 is a screenshot illustrating an exemplary user interface for managing DNS zones.
Figure 3:
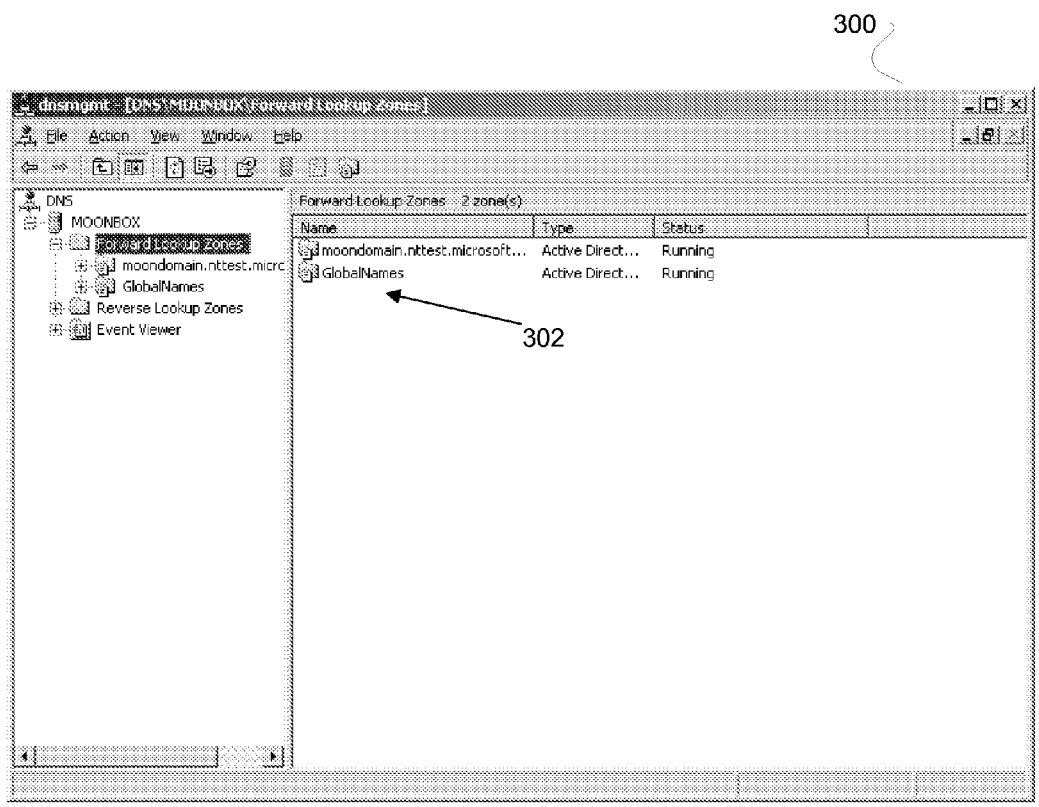
FIG. 3 is a screenshot illustrating an exemplary user interface for displaying DNS zones.
Figure 4:
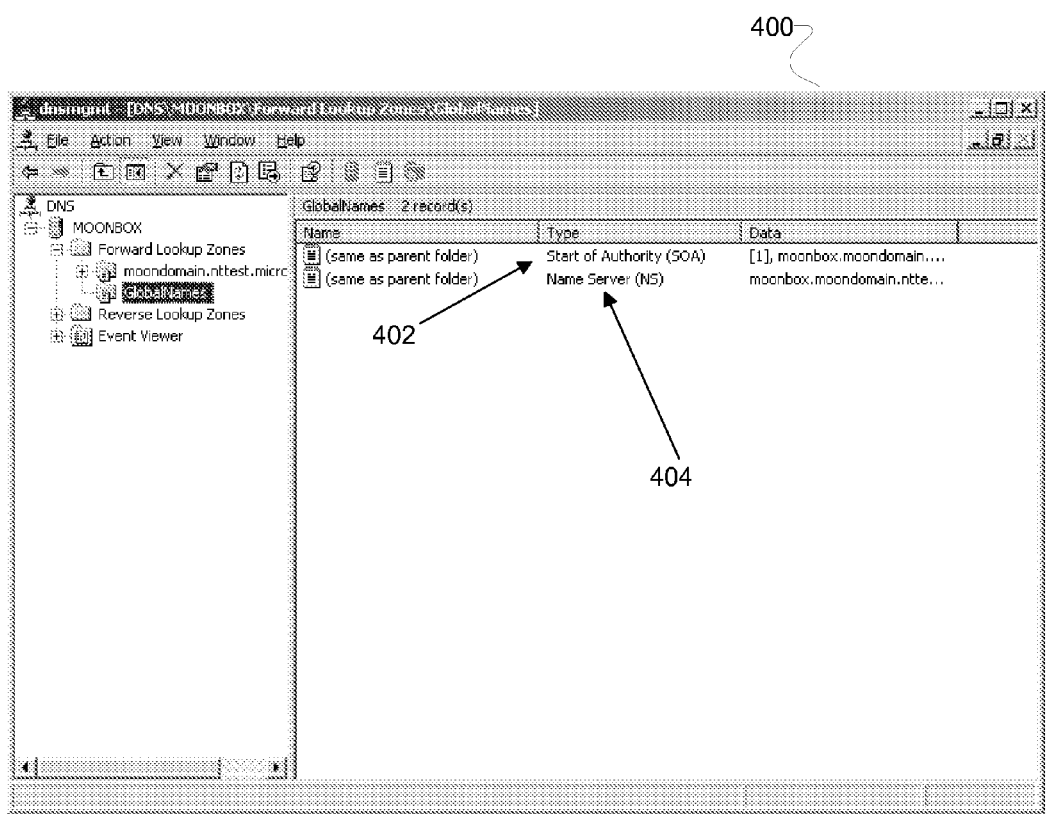
FIG. 4 is a screenshot illustrating an exemplary user interface for displaying resource records.

FIGS. 2-4 are screenshots illustrating exemplary user interfaces 200, 300, and 400 for managing DNS zones. FIG. 2 shows an example of a DNS system including one forward lookup zone 204 named "moondomain.nttest.microsoft.com". The forward lookup zone 204 stores resource records that include information, such as IP addresses, associated with domain names. To create a global names zone, an administrator may add a new zone via a selection 202 on a pull-down menu. The administrator may choose various options for the new zone, such as whether the zone is a primary or secondary zone and whether the zone is to be filed-backed or integrated with a directory system, such as an Active Directory® system. The administrator may then choose a unique name for the zone, such as "Global Names".

FIG. 3. shows the added Global Names zone 302. The Global Names zone stores records that correlate host names to domain names. FIG. 4. shows the records, 402 and 404, that are stored in the Global Names zone. Each record has a record type and data. Examples of record types include but are not limited to Start of Authority (SOA), Name Server (NS), Host (A), Mail Exchanger (MX), and Canonical Name (CNAME). For each record type, a host name stored in the global names zone 110 is uniquely correlated to one domain name. When the DNS system includes a global names zone, the DNS server will check the global names zone first when the DNS server receives a name query, registration, or update. For a registration or update, the global names zone is checked to determine whether there is already a record with the same record type and same host name. If so, then the registration or update is rejected. For a name query, the global names zone is checked to determine whether there is a record correlating the host name with a domain name. If so, then the domain name is returned to the DNS server and used to determine the IP address.

Figure 5:
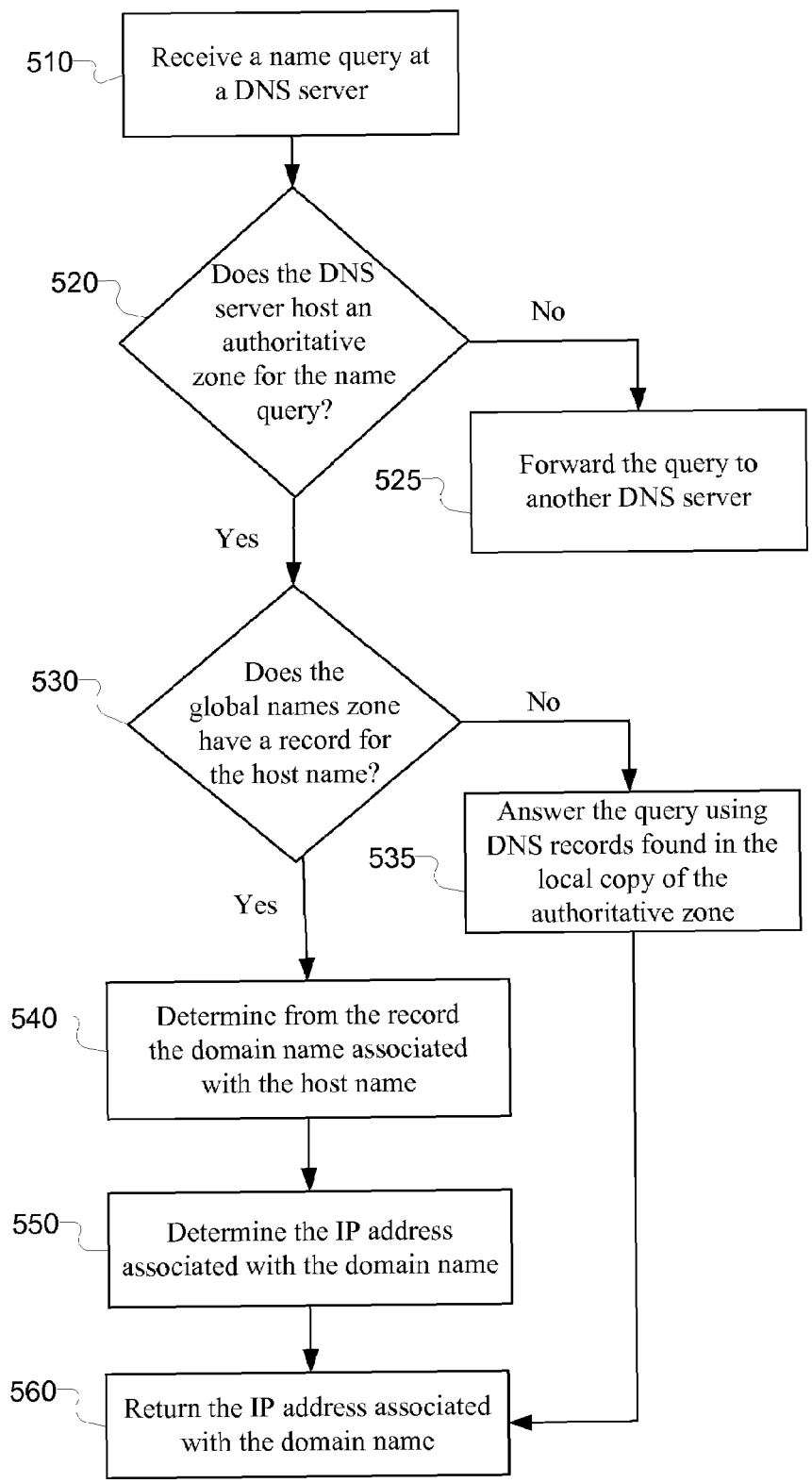
FIG. 5 is a flow diagram illustrating an exemplary process for resolving a name query.
Figure 6:
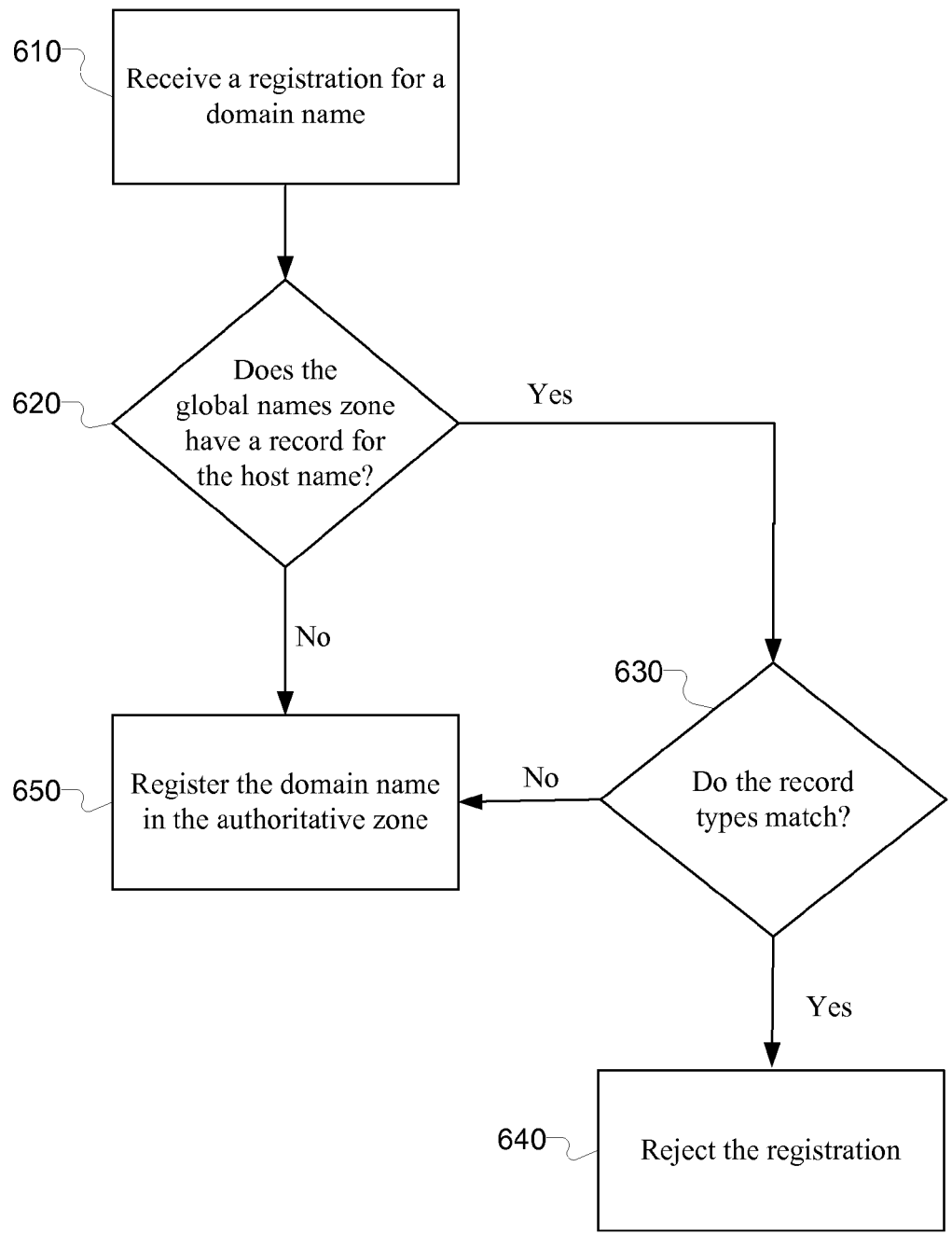
FIG. 6 is a flow diagram illustrating an exemplary process for registering a domain name.

FIGS. 5-6 are flow diagrams illustrating exemplary processes for implementing a global names zone. While the description of FIGS. 5-6 may be made with reference to other figures, it should be understood that the exemplary processes illustrated in FIGS. 5-6 are not intended to be limited to being associated with the systems or other contents of any specific figure or figures. Additionally, it should be understood that while the exemplary processes of FIGS. 5-6 indicate a particular order of operation execution, in one or more alternative implementations, the operations may be ordered differently. Furthermore, some of the steps and data illustrated in the exemplary processes of FIGS. 5-6 may not be necessary and may be omitted in some implementations. Finally, while the exemplary processes of FIGS. 5-6 contains multiple discrete steps, it should be recognized that in some environments some of these operations may be combined and executed at the same time.

FIG. 5 is a flow diagram illustrating an exemplary process for resolving a name query. At 510, a name query is received at a DNS server from a client device. The name query includes a host name. At 520, a determination is made as to whether the DNS server hosts the authoritative zone for the name query. If not, then at 525, the name query may be forwarded to another DNS server that hosts the authoritative zone for the name query.

If the DNS server does host the authoritative zone for the name query, then at 530, a determination is made as to whether there is a record for the host name in the global names zone. If not, then at 535, the query is answered using the DNS records found in a local copy of the authoritative zone. The IP address associated with the name is determined, and the IP address is returned to the client device at 560.

If the global names zone does have a record for the host name, then at 540, the record for the host name in the global names zone is checked to determine the domain name associated with the host name. At 550, the IP address that is associated with the domain name is determined. At 560, the IP address associated with the domain name is returned to the client device.

FIG. 6 is a flow diagram illustrating an exemplary process for registering a domain name. At 610, a registration or update for a domain name is received. The registration or update may be received at a DNS server that does not host the authoritative zone for the domain name. In this case, the registration or update may be forwarded to another DNS server that hosts the authoritative zone for the domain name.

If the DNS does host an authoritative zone for the name query, then at 620, the DNS server checks the global names zone for a record associated with the host name. If there is no record for the host name in the global names zone, then at 650, the domain name is registered or updated in the authoritative zone as requested.

If the global names zone does already have a record for the host name, then the record type of the domain name registration or update is determined. At 630, the record type of the domain name registration or update is compared with the record type of the record for the host name stored in the global names zone. If the record types match, then at 640, the registration or update is rejected. If the record types do not match, then at 650, the domain name is registered or updated in the authoritative zone as requested.

Figure 7:
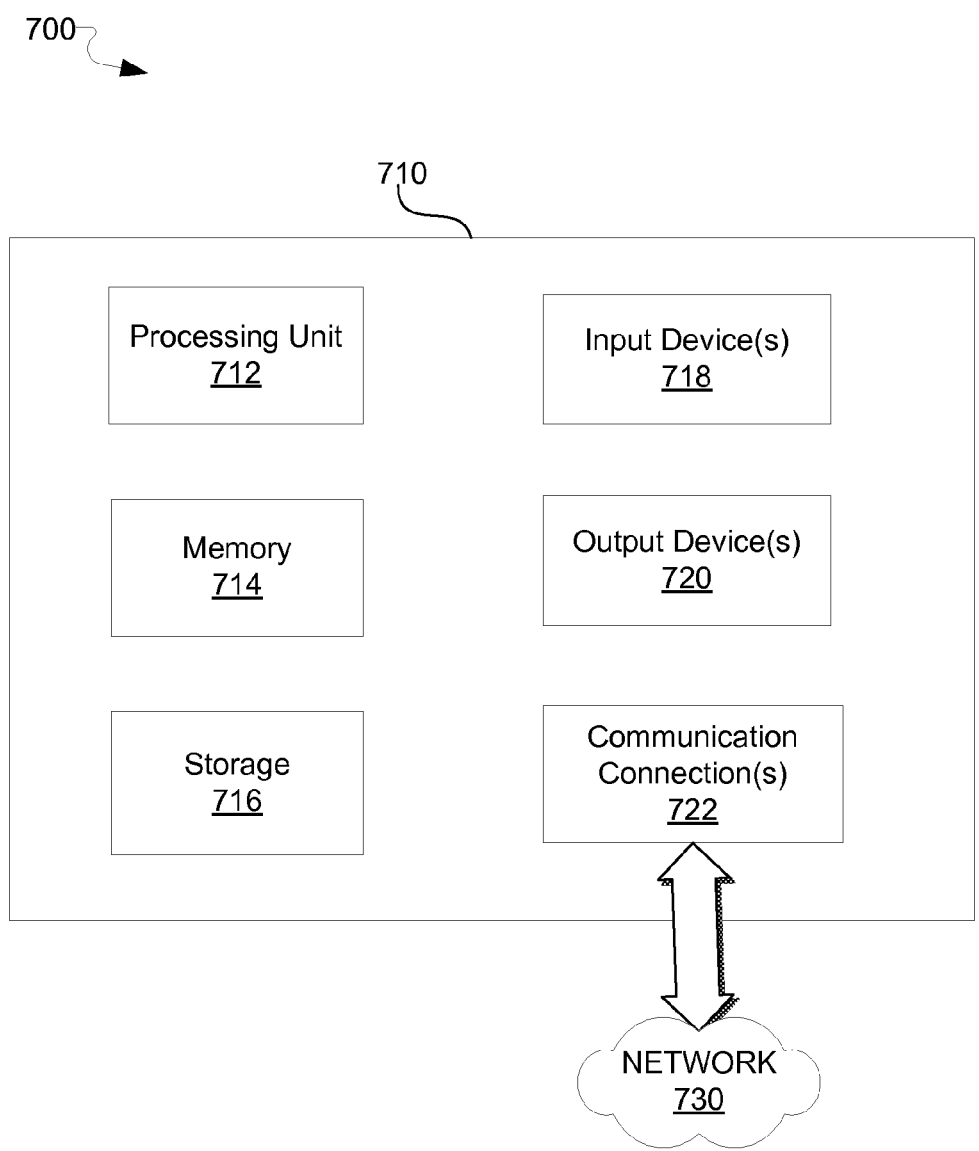
FIG. 7 illustrates an exemplary computing environment in which certain aspects of the invention may be implemented.

FIG. 7 illustrates an exemplary computing environment in which certain aspects of the invention may be implemented. It should be understood that computing environment 700 is only one example of a suitable computing environment in which the various technologies described herein may be employed and is not intended to suggest any limitation as to the scope of use or functionality of the technologies described herein. Neither should the computing environment 700 be interpreted as necessarily requiring all of the components illustrated therein.

The technologies described herein may be operational with numerous other general purpose or special purpose computing environments or configurations. Examples of well known computing environments and/or configurations that may be suitable for use with the technologies described herein include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

With reference to FIG. 7, computing environment 700 includes a general purpose computing device 710. Components of computing device 710 may include, but are not limited to, a processing unit 712, a memory 714, a storage device 716, input device(s) 718, output device(s) 720, and communications connection(s) 722.

Processing unit 712 may include one or more general or special purpose processors, ASICs, or programmable logic chips. Depending on the configuration and type of computing device, memory 714 may be volatile (such as RAM), non-volatile (such as ROM, flash memory, etc.) or some combination of the two. Computing device 710 may also include additional storage (removable and/or non-removable) including, but not limited to, magnetic or optical disks or tape. Such additional storage is illustrated in FIG. 7 by storage 716. Computer storage media includes volatile and nonvolatile, removable and non-removable media implemented in any method or technology for storage of information such as computer readable instructions, data structures, program modules or other data. Memory 714 and storage 716 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 710. Any such computer storage media may be part of computing device 710.

Computing device 710 may also contain communication connection(s) 722 that allow the computing device 710 to communicate with other devices, such as with other computing devices through network 730. Communications connection(s) 722 is an example of communication media.

Computing device 710 may also have input device(s) 718 such as a keyboard, a mouse, a pen, a voice input device, a touch input device, and/or any other input device. Output device(s) 720 such as one or more displays, speakers, printers, and/or any other output device may also be included.

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. A method comprising:
maintaining global name zone data that has records corresponding to hosts, each record comprising at least a host name and a sub-domain name of its corresponding host, where the global name zone data is maintained to prevent records having same host names and different sub-domain names, wherein a domain name comprises a plurality of separate parts, a leftmost part of the domain name representing the host name and a rightmost part of the domain name representing a top-level domain name;
receiving at a domain name system (DNS) server a name registration request from a client device, the name registration request including a leftmost part of a requested domain name, the requested domain name comprising a domain name that would be created if the requested were completed;
determining, without regard for the sub-domain names of the records in the global names zone data, whether the global names zone data has a record having the same leftmost part of the requested domain name that is in the name registration request;
rejecting the registration request if there is already a record in the global names zone data with the same leftmost part of the domain name that would result if the request were completed: and
registering an Internet Protocol (IP) address for the host name if there is no same leftmost part of the requested domain name in the global name zone data.

2. The method of claim 1, further comprising determining whether the DNS sewer hosts an authoritative zone for the name registration request.

3. The method of claim 1, wherein the global names zone data corresponds to a forward lookup zone.

4. The method of claim 1, wherein the global names zone data corresponds to a primary zone.

5. The method of claim 1, wherein the global names zone data is file-backed.

6. The method of claim 1, wherein the global names zone data is integrated with a directory system.

7. A system comprising:
a domain name system (DNS) server; and
one or more data stores operating with the DNS server to store records for domain names, the one or more data stores including global names zone records, a global name zone record comprising a host name and a corresponding sub-domain name of a device represented by the record, wherein a domain name comprises a plurality of separated parts, a leftmost part of the domain name representing the host name and a rightmost part of the domain name representing a top-level domain name, where the global name zone records are managed and maintained such that they are either (1) unique by both their respective leftmost parts of their corresponding domain names and respective sub-domain names, or (2) are unique by their respective leftmost parts of their corresponding domain names and respective sub-domain names and a corresponding DNS record type, and where the one or more data stores are used to determine whether to register a requested domain name with the DNS server, where the determining is based on whether there is already a record in the global names zone data with a leftmost part of the domain name that is the same as the leftmost part of the requested domain name, whereby the zone data is maintained to prevent records having same host names and different sub-domain names.

8. The system of claim 7, wherein the one or more data stores include one or more forward lookup zones.

9. The system of claim 7, wherein the one or more data stores include one or more primary zones.

10. The system of claim 7, wherein the global names zone is a primary forward lookup zone.

11. The system of claim 7, wherein the one or more data stores store records that include data correlating domain names with Internet Protocol (IP) addresses.

12. One or more device-readable storage media storing information for performing steps, the steps comprising:
receiving a domain name registration request for registering a domain name, the domain name including a host name and a sub-domain name, the host name and sub-domain name corresponding to a device, wherein the domain name comprises a plurality of dot-separated parts, the host name corresponding to a leftmost part of the domain name and a top-level domain name corresponding to a rightmost part of the domain name; and maintaining a global names zone data store to prevent records thereof from having same host names and different sub-domain names by:

determining whether the global names zone data store has a record with a leftmost part of a domain name that matches the host name in the registration request, where whether they match is based on whether the requested host name is the same as the leftmost part of the record's domain name;

registering the domain name if the global names zone does not have a record with a leftmost part of a domain name that matches the host name of the registration request; and rejecting the registration of the domain name if the global names zone does have a record with a left most part of its domain name that matches the host name of the registration request.

13. The one or more device-readable storage media of claim 12, wherein receiving the domain name registration request for registering a domain name comprises receiving the request at a domain name system (DNS) server.

14. The one or more device-readable storage media of claim 13, wherein the steps further comprise determining whether the DNS server hosts an authoritative zone for the domain name of the registration request.

15. The one or more device-readable storage media of claim 14, wherein the steps further comprise forwarding the registration request to another DNS server that hosts the authoritative zone for the domain name.

16. The one or more device-readable storage media of claim 14, wherein registering the domain name comprises registering the domain name in the authoritative zone.

17. The one or more device-readable storage media of claim 14, wherein the steps further comprise:

determining a first record type for the domain name registration request, determining a second record type of the record for the host name stored in the global names zone, and determining whether the first record type matches the second record type.

18. The one or more device-readable storage media of claim 17, wherein the steps further comprise rejecting the registration request if the first record type matches the second record type.

19. The one or more device-readable storage media of claim 17, wherein the steps further comprise registering the domain name in the authoritative zone if the first record type does not match the second record type.

20. A method for registering host names, the method comprising:

maintaining global name zone data, the global name zone data having records for respective hosts registered in authoritative zones for which a Domain Name Service (DNS) server is the authoritative server, a record comprising a host name, a sub-domain name, and a top-level domain name of the record's corresponding host, wherein a domain name is comprised of separate parts that correspond to different domain levels and the host name represents only the lowest of the domain levels, where requested new host names are rejected from being added to the global name zone data based on the existence in the global name zone data of one or more records already having the requested new host names, and where the requested new host names are prevented from being added without regard for the sub-domain names and the top-level domain names of the existing records, thereby maintaining uniqueness of lowest domain level host names across multiple authoritative zones;

receiving, at the DNS server, via a network, a request to register a host name included with the request, the requested host name corresponding to only the lowest domain level of a corresponding domain name;

in response to receiving the request, determining whether the host name in the request is already stored in the global name zone data store, where the determination is made without regard for the sub-domain names and the top-level domain names of the records in the global name zone data store; and in response to a determination that the host name is not already stored in the global name data store, performing, by the DNS server, a DNS registration for the requested host name, whereby the global name zone data is maintained to prevent records having same host names and different sub-domain names.

21. A method according to claim 20, wherein there exist multiple records in the global name zone data store with a same host name.

22. A method according to claim 21, wherein multiple the multiple records comprise: a first record having the same host name and a first DNS record type, and a second record having the same host name and a second DNS record type.

* * * * *